A. L. HARVEY.
MOTOR CONTROL SYSTEM.
APPLICATION FILED NOV. 3, 1919.
1,425,648.
Patented Aug. 15, 1922.
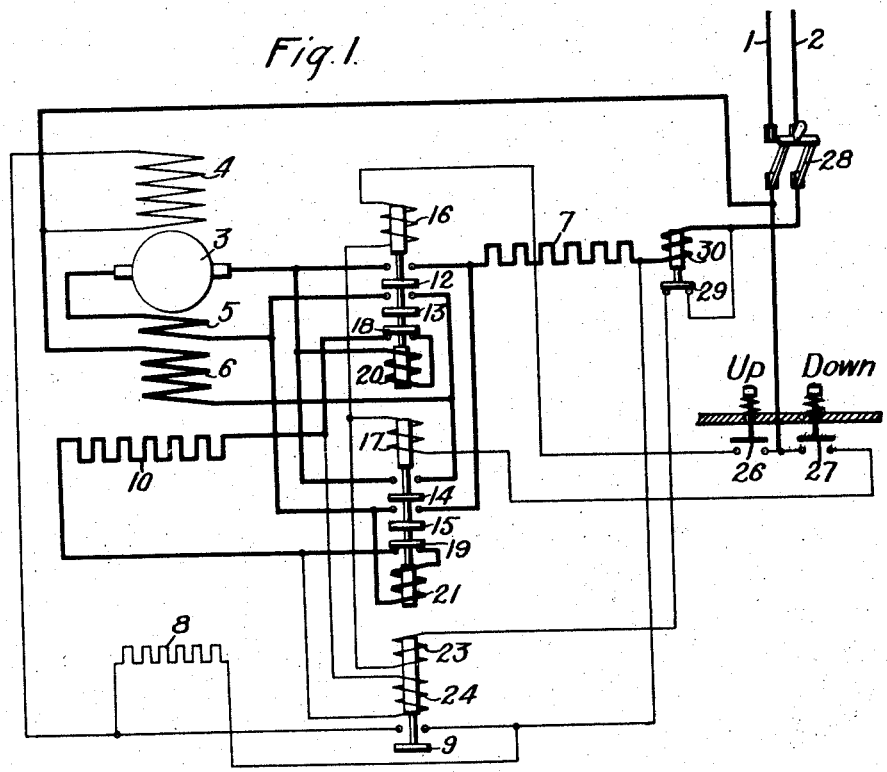
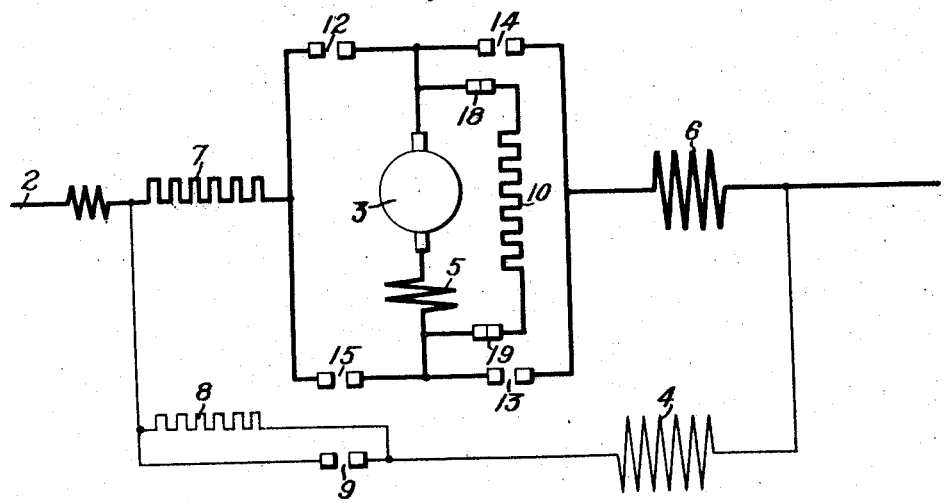
WITNESSES:
J. A. Helsel
J. R. Langley
INVENTOR
Albert L. Harvey.
BY
Wesley G. Carr
ATTORNEY

UNITED STATES PATENT OFFICE.

ALBERT L. HARVEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,425,648.   Specification of Letters Patent.   Patented Aug. 15, 1922.

Application filed November 3, 1919. Serial No. 335,468.

*To all whom it may concern:*

Be it known that I, ALBERT L. HARVEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to such systems as are employed in connection with the auxiliary motors of machine tools and similar machines.

My invention has for its object to provide a simple and automatic controlling means for insuring the normal field excitation of electric motors during their normal operation and during dynamic braking and for effecting economy of power when the motors are at rest.

In the operation of electric motors for such intermittent service as requires that they be accelerated and brought to rest within brief periods of time, it is necessary to provide automatic means for insuring that the field of a motor employed in such service shall be excited to the normal degree upon the closing of the motor circuit in order that an excessive rush of current shall not occur and that it may have a high torque for starting under load. It is desirable, also, that the same conditions in the motor field shall obtain during dynamic braking in order that the motor may be brought to rest as quickly as possible, consistent with safety to the motor.

If the field-magnet windings of an electric motor employed in intermittent service are fully energized during such periods as the motor is at rest, there is a comparatively large waste of energy. It is necessary, however, to excite the motor field to such degree, during the periods of rest, that the inductance of the windings and reluctance of the magnetic circuits shall be partially overcome before the circuit is closed, in order to avoid the delay caused by building up the field from zero excitation.

According to the present invention, I employ a single switch for controlling a field resistor for an electric motor. The switch is provided with two actuating coils, one of which is in series with the actuating coils of the usual reversing switches and the other of which is connected across the terminals of the usual dynamic-braking resistor. The switch is closed when either of its actuating coils is energized to a predetermined degree. The switch is open when the armature circuit is open and when the difference in potential between the terminals of the dynamic-braking resistor is below a predetermined value.

The above-described arrangement insures that the field resistor shall be shunted to provide the normal degree of field excitation when the main circuit of the motor is closed for operation of the motor in either direction and when the current traversing the dynamic-braking circuit exceeds a predetermined value. The field resistor is inserted in the field circuit to reduce the value of the current traversing it when the motor is at rest or when the motor speed is below a predetermined rate during dynamic braking.

In the accompanying drawing, Fig. 1 is a diagrammatic view of circuits and apparatus embodying my invention; Fig. 2 is a schematic diagram of the system of Fig. 1.

Line conductors 1 and 2, which may be connected to any suitable source of energy, supply current to an electric motor, the armature of which is indicated at 3 and which is provided with a shunt field-magnet winding 4 and series field-magnet windings 5 and 6. A resistor 7 is in the armature circuit of the motor during normal operation of the latter. A shunt circuit for a resistor 8, that is in circuit with the shunt field-magnet winding 4, is controlled by a switch 9. A dynamic-braking resistor 10 is in circuit with the motor armature when the operating circuit of the motor is open.

The armature circuits of the motor are controlled by two pairs of mechanically-connected reversing switches 12 and 13 and 14 and 15. The respective pairs of reversing switches are provided with actuating coils 16 and 17. The dynamic-braking circuit of the motor is completed by switches 18 and 19 that are mechanically interlocked to the respective pairs of reversing switches and are maintained in their respective closed positions by series holding coils 20 and 21.

The switch 9 is provided with two actuating coils 23 and 24. The coil 23 is in series-circuit relation to the coils 16 and 17, which are connected in parallel relation to each other. The coil 24 is connected across the terminals of the dynamic-braking resistor 10 and is responsive, therefore, to the difference in potential across the resistor 10, which is proportional to the current traversing the dynamic-braking circuit. The reversing switches are respectively controlled by push-button switches 26 and 27 that are respectively designated by legends "Up" and "Down" to indicate the corresponding directions of the device actuated by the motor.

It may be assumed that the various switches are in their respective illustrated positions. A line switch 28 is closed to connect the system to a source of energy. It may be assumed that the push-button switch 26 is actuated to effect the operation of the motor in the desired direction. A circuit, which is completed thereby, extends from the line conductor 2 through overload relay 29, coil 23, coil 16 and push-button switch 26 to line conductor 1. The coil 16 is energized to close switches 12 and 13 and the armature circuit, which is thereby completed, extends from line conductor 2, through overload relay coil 30, resistor 7, switch 12, armature 3, series field-magnet winding 5, switch 13 and series field-magnet winding 6, to line conductor 1.

The coil 23 is energized simultaneously with the coil 16, and the switch 9 is closed to complete a shunt circuit for the field resistor 8 and thereby insure full field excitation for the motor at the instant of completion of its main circuit. The switch 9 remains in its closed position so long as the push-button switch 26 is closed to maintain the operation of the motor in the direction indicated above.

To bring the motor to rest, the push-button switch 26 is released to open the circuit of the coils 16 and 23. The corresponding switches are opened and the switch 18 completes a dynamic-braking circuit for the motor which extends from the armature 3, through coil 20, switch 18, dynamic-braking resistor 10, switch 19, coil 21 and series field-magnet winding 5, to the armature 3. Since the motor is operating at a relatively high speed, a heavy rush of current immediately traverses the dynamic-braking circuit, causing a relatively high difference in potential between the terminals of the resistor 10 and, accordingly, between the terminals of the coil 24. The coil 24 is energized to close the switch 9 to complete a shunt circuit for the field resistor 8. A normal degree of field excitation for the motor is thereby insured during dynamic braking.

When the current traversing the dynamic-braking circuit and the difference in potential across the terminals of the dynamic-braking resistor 10 fall to such values that the coil 24 is energized below a predetermined degree, the latter permits the switch 9 to open and again insert the resistor 8 in circuit with the shunt field-magnet winding 4.

The operation of the motor in the opposite direction is effected by depressing the push-button switch 27. The operation is similar, in every respect, to that described above in connection with the push-button switch 26 except that the reversing switches 14 and 15 are closed to reverse the connections of the armature 3. A detailed description of this portion of the operation of the system is omitted as unnecessary to a full understanding of the invention.

It will be noted that I provide an arrangement whereby a single switch is effective to insure full field excitation of the motor upon the completion of its armature circuit, either for normal operation or for dynamic braking. The provision of two actuating coils, one of which is in series with the actuating coils of the directional switches and the other of which is responsive to the value of the current traversing the dynamic-braking circuit, permits the elimination of one or more of the switches usually provided for the purpose of controlling the field excitation of a motor.

The reduction of the armature current occurs automatically upon the dynamic braking of the motor to a predetermined minimum speed. The controlling mechanism is extremely simple, thus rendering its action certain in all cases.

I claim as my invention:

1. In a motor-control system, the combination with an electric motor and means for controlling the armature circuit thereof, of means comprising a single switch, for insuring the normal degree of field excitation throughout the normal operation and throughout the dynamic braking of said motor.

2. In a motor-control system, the combination with an electric motor and means for controlling the armature circuit thereof, of means, comprising a switch, for controlling the field excitation of said motor, said switch having two actuating coils that are respectively energized during the normal operation and during the dynamic braking of said motor.

3. In a motor-control system, the combination with an electric motor and means for controlling the armature circuit thereof, of means, comprising a single switch, for adjusting the field excitation of said motor during normal operation and during dynamic braking while maintaining the field circuit closed.

4. In a motor-control system, the combination with an electric motor and a field resistor therefor, of a single switch for automatically controlling said resistor under normal operating conditions and during the dynamic braking of said motor, said switch being adapted to be energized from different portions of the system under the respective conditions.

5. In a motor-control system, the combination with an electric motor, a field resistor and a dynamic-braking resistor, of a switch for controlling said field resistor and having an actuating coil connected across the terminals of said dynamic-braking resistor.

6. In a motor-control system, the combination with an electric motor, a field resistor and a dynamic-braking resistor, of a switch for controlling said field resistor, said switch having actuating means energized under normal operating conditions of said motor and in accordance with the value of the current traversing said dynamic-braking resistor.

7. In a motor-control system, the combination with an electric motor, a main switch therefor having an actuating coil, a field resistor and a dynamic-braking resistor, of a switch for controlling a shunt circuit for said field resistor, said switch having an actuating coil in circuit with the actuating coil of said main switch and having a second actuating coil in circuit with said dynamic-braking resistor.

In testimony whereof, I have hereunto subscribed my name this 28th day of Oct., 1919.

ALBERT L. HARVEY.